(12) United States Patent
Josenhans

(10) Patent No.: US 7,363,222 B2
(45) Date of Patent: Apr. 22, 2008

(54) METHOD FOR SEARCHING DATA IN AT LEAST TWO DATABASES

(75) Inventor: Michael Josenhans, Haltern (DE)

(73) Assignee: Nokia Corporation, Espoo (FI)

( * ) Notice: Subject to any disclaimer, the term of this patent is extended or adjusted under 35 U.S.C. 154(b) by 595 days.

(21) Appl. No.: 10/482,517

(22) PCT Filed: Jun. 24, 2002

(86) PCT No.: PCT/IB02/02345

§ 371 (c)(1), (2), (4) Date: Jul. 26, 2004

(87) PCT Pub. No.: WO03/003249

PCT Pub. Date: Jan. 9, 2003

(65) Prior Publication Data

US 2004/0243562 A1 Dec. 2, 2004

(30) Foreign Application Priority Data

Jun. 28, 2001 (EP) .................................. 01115811

(51) Int. Cl.
G10L 15/10 (2006.01)
G10L 15/28 (2006.01)
G06F 7/06 (2006.01)

(52) U.S. Cl. ........................... 704/231; 704/238; 707/3

(58) Field of Classification Search ................. 704/231, 704/236, 238, 251, 270.1, 275; 707/1, 2, 707/3, 104.1
See application file for complete search history.

(56) References Cited

U.S. PATENT DOCUMENTS 4,453,217 A 6/1984 Boivie 4,829,576 A * 5/1989 Porter .................. 704/235
5,608,624 A * 3/1997 Luciw .................. 715/532
5,909,665 A * 6/1999 Kato .................... 704/241

(Continued)

FOREIGN PATENT DOCUMENTS

DE 196 44 104 4/1998

(Continued)

Primary Examiner—Martin Lerner
(74) Attorney, Agent, or Firm—Alfred A. Fressola; Ware, Fressola, Van Der Sluys & Adolphson LLP

(57) ABSTRACT

A method and database system is disclosed for searching data in at least two databases ($D_n$), particularly for searching telephone directories or the like. To allow simultaneous access to two or more databases by means of speech recognition in order to perform a search therein as in a single database, a search term is input by speech via a voice controlled user interface (28) connected to a database primary control apparatus (26) and comprises speech recognition front end means (8, 9) for processing a sound sequence of a search term input by speech to obtain a comparable speech pattern (X) thereof. By means of speech recognition back end means (6) associated with databases ($D_1$-$D_6$), the comparable speech pattern (X) is compared with corresponding speech patterns ($A_{n,i}$) of database entries ($E_{n,i}$) to determine for each of the at least two databases ($D_n$) at least that database entry ($E_{n,j}$) the speech pattern ($A_{n,j}$) which best matches the comparable speech pattern (X) of the search term.

9 Claims, 3 Drawing Sheets

U.S. PATENT DOCUMENTS

| | | | |
|---|---|---|---|
| 6,138,094 A * | 10/2000 | Miet et al. | 704/233 |
| 6,745,182 B2 * | 6/2004 | Josenhans | 707/4 |
| 6,912,496 B1 * | 6/2005 | Bhattacharya et al. | 704/228 |
| 6,934,703 B2 * | 8/2005 | Josenhans | 707/3 |
| 6,996,531 B2 * | 2/2006 | Korall et al. | 704/270 |
| 7,085,716 B1 * | 8/2006 | Even et al. | 704/235 |
| 2001/0004737 A1 * | 6/2001 | Laux | 707/1 |

FOREIGN PATENT DOCUMENTS

| | | |
|---|---|---|
| DE | 199 28 666 | 12/2000 |
| EP | 0 295 876 | 12/1988 |
| WO | WO 99/55058 | 10/1999 |
| WO | WO 00/46969 | 8/2000 |

* cited by examiner

| D1 |
|---|
| EEPROM |
| ADAC |
| BMW |
| Bodega Dali |
| David |
| Halali |
| NOKIA |
| Petra at home |
| Ristorante Roma |
| Unger |

| D5 |
|---|
| SIM (mobile) |
| Alex |
| Bernard |
| Clarence |
| David |
| Nokia Ulm |
| Norbert |
| Petra |
| Schink |
| Urner |

| D6 |
|---|
| RAM (watch) |
| Andy |
| Alice |
| Bernie |
| Dad |
| Larry |
| Mike |
| Petra at home |
| Petra |
| Unger |

METHOD FOR SEARCHING DATA IN AT LEAST TWO DATABASES

CROSS REFERENCE TO RELATED APPLICATIONS

This application is for entry into the U.S. national phase under §371 for International Application No. PCT/IB02/02345 having an international filing date of Jun. 24, 2002, and from which priority is claimed under all applicable sections of Title 35 of the United States Code including, but not limited to, Sections 120, 363 and 365(c), and which in turn claims priority under 35 USC §119 to European Patent Application No. 01115811.0 filed on Jun. 28, 2001.

TECHNICAL FIELD

The invention relates to a method for searching for data in at least two databases, in particular for searching for telephone directory, address book or appointments diary entries or the like in at least two telephone directory, address book or appointments diary databases or the like, and also to a database system having at least two databases which is particularly suitable for carrying out the inventive method for searching for data.

BACKGROUND OF THE INVENTION

As electronic devices such as mobile telephones, that is to say car telephones and 'mobiles', cordless telephones, which communicate via a base station connected to the landline network, electronic notebooks and PCs, which contain databases, such as personal telephone directories, appointments diaries, personal address books, task lists and the like, become more and more widespread, there is the increasing problem that a user needs to manage various electronic telephone directories and/or electronic appointments diaries. If a user uses a cordless telephone with an electronic telephone directory at home in his apartment, for example, then the electronic telephone directory primarily stores private telephone numbers, whereas his work mobile primarily stores work telephone numbers. Further telephone directory entries may be stored in the car telephone, and if he/she additionally uses a private mobile telephone or mobile as well, this contains further, private and work telephone numbers. In this context, important telephone numbers are frequently stored in a plurality of communication devices used by the user, while other telephone numbers can be found only in a single one of the personal telephone directories in each case. In addition, the user may also have access to electronic telephone directories in his private and/or workplace PC.

In addition, a lot of mobile telephones operated with a SIM card (subscriber identity module) have the facility to store telephone directory entries either in the memory of the SIM card or in a further memory of the appliance itself. This is the case with the Nokia 9110 Communicator, for example. While the SIM card can hold 125 entries in the case of the current prior art, several 100 to several 1000 entries can be made in the memory area of the Nokia 9110 Communicator, depending on the additional memory used.

Parallel access to the various memory areas or the various electronic telephone directories is currently not possible, which means that a user must either constantly coordinate all his available telephone directories with one another if he wants to have all telephone numbers constantly available, or he needs to search through the individual electronic telephone directories one after the other. The problem described in this case in connection with electronic telephone directories with mobile and cordless telephones also concerns, by way of example, address books, appointments diaries and other databases which are provided in PCs, electronic appointments diaries and planners and the like, however.

DE 196 44 104 C1 discloses a communication device which has a main data memory in a mobile telephone and has a call number memory in a voice dialing unit connected to the mobile telephone by means of a cable. In this context, the main data memory serves as a database for a personal telephone directory, while the call number memory stores some of the data recorded in the personal telephone directory, which data can be used to access the telephone directory entries in order to select a stored telephone number. In this case, the main data memory has access to the call number memory and is able to change and/or add to entered data in order to ensure that the telephone numbers stored in the main data memory can be reliably accessed using the call number memory.

It is not necessary to search through the two interconnected memories simultaneously in this case, since the call number memory does not represent another personal telephone directory, but rather only a data list which stores for telephone directory entries in the main data memory the name of the entry and the memory location.

Further, although speech recognition becomes more and more popular for controlling electronic devices like mobile telephones, PCs, electronic appointments diaries and planners and the like, user interfaces using speech recognition are usually only used in systems having the databases stored in the same device.

If speech control via communication links is today done, then it is done by transferring the voice stream via the communication link, which needs a rather high data rate and also a separate voice link. Examples are automatic voice recognition systems used in the telephone network for customer inquiry.

SUMMARY OF THE INVENTION

Against this background, the invention is based on the object to provide a method and a database system of the initially named kind which allows simultaneous access to two or more databases by means of speech recognition in order to be able to perform a search therein as in a single database.

This object is achieved by searching data in at least two databases ($D_n$), in particular for searching telephone directory, address book or organizer entries or the like in at least two telephone directory, address book or organizer databases or the like, comprising the steps of: inputting a search term by speech; processing a sound sequence of the search term to obtain a comparable speech pattern (X) thereof; comparing the comparable speech pattern (X) of the search term with corresponding speech patterns ($A_{n,i}$) of database entries ($E_{n,i}$) to determine for each entry ($E_{n,i}$) of the at least two databases ($D_n$) a measure $m(X,A_{n,i})$ for the matching distance between the compared speech patterns to determine at least that database entry ($E_{n,j}$) of each database ($D_n$) the speech pattern ($A_{n,j}$) of which matches the comparable speech pattern (X) of the search term best; selecting that database entry ($E_{p,j}$) the speech pattern ($A_{p,j}$) of which matches the comparable speech pattern (X) of the search term best from the entries ($E_{n,j}$) determined in the previous step by searching that measure $m_n(X,A_{n,j})$ that indicates the best matching speech pattern of the database entries; and outputting an identifier of that database entry ($E_{p,j}$) that has been selected in the previous step. This object is also achieved by a database system characterized in that said speech recognition middle part means (7) comprises comparing means for comparing measures $m_n(X,A)$ for the matching distances between the compared speech patterns and for selecting that database entry (E) the speech pattern of which matches the comparable speech pattern of the search term best. Advantageous developments of the method and of the database system are described in the respective subordinate subclaims.

The inventive method is distinguished by inputting a search term by speech, processing a sound sequence of the search term to obtain a comparable speech pattern thereof, comparing the comparable speech pattern with corresponding speech patterns of database entries to determine for each of the at least two databases at least that database entry the speech pattern of which matches the comparable speech pattern of the search term best selecting that database entry the speech pattern of which matches the comparable speech pattern of the search term best from the entries determined in the previous step, and outputting an identifier of that database entry that has been selected in the previous step.

According to the present invention it is possible to conduct a speech recognition based search through a plurality of databases, in particular of telephone directory, address book or organizer databases distributed on several devices connected by digital communication links in such a way as all the databases form an integral single database. Therefore, it is not necessary for a user to update each of his/her telephone directories or address books.

According to a preferred embodiment of the present invention it is provided that for each database a respective table is set up that contains all database entries in the order in which their speech pattern phonetically match the speech pattern of the search term. Due to setting up tables organized in a phonetical order it is possible to cycle or scroll through the databases for searching specific entries not in an alphabetic but in a phonetical or acoustical order. Therefore, it is possible to search names even in the case that the user only remembers the entered name and how it sounds but forgot how it was correctly spelled.

In general, each kind of comparable speech pattern can be used with the inventive method. However, it is preferred that processing the sound sequence of the search term results in a phoneme sequence used as a comparable speech pattern.

An advantageous provision is that the comparable speech pattern of the search term is compared with the comparable speech patterns of database entries to determine for each entry of a database a measure for the matching distance between the compared speech patterns, and at least that database entry the comparable speech pattern of which matches the comparable speech pattern of the search term best is determined by searching that measure that indicates the best matching speech pattern of the database entries, wherein that measure that indicates the closest matching distance between the compared speech patterns is determined in accordance with the following equation $m_n(X,A_{n,j}) < m(X,A_{n,i})$ for all $i \neq j$, wherein $i=1, 2, \ldots k_n$ and $k_n$ the number of entries of $n^{th}$ database.

The use of a measure that is related to the matching distance between the compared speech patterns makes it easy to set up a table that contains the entries of a database in a phonetical order, i.e. in the order of increasing or decreasing matching distances. The measure can be any kind of metric that depends on the specific kind of comparable speech pattern. If the speech pattern of a sound sequence uttered by a user is regarded as a kind of vector, the metric can simply be the difference of two vectors describing the sound pattern.

In case that the measure indicating the matching distance between the sound pattern of a database entry and the sound pattern of the search term is just the same for each database, it is possible that the measures indicating the best matching database entries of each database are compared to select that database entry the speech pattern of which matches the comparable speech pattern of the search term best.

Alternatively, it is possible that the comparable speech pattern of the search term is compared with the comparable speech patterns of that database entries that have been determined as that of the respective databases that matches the search term best to determine for each of these entries a measure for the matching distance between the compared speech patterns, and at least that database entry that matches the search term best of all is determined by searching that measure that indicates the best matching speech pattern of all the database entries of all databases, wherein that measure that indicates the closest matching distance between the compared speech patterns is determined in accordance with the following equation $m_n(X,A_{p,j}) < m(X,A_{n,j})$ for all $n \neq p$, wherein $n=1, 2, \ldots q$ and q is the number of databases to be searched. In the latter case, it is not necessary that the same metric or the same way of generating a measure is used for each database. Therefore, this makes it possible to use the inventive method without harmonizing the several processes of calculating the measures used for determining the entry with the best matching sound pattern.

Another development of the invention is characterized in that the identifier of that database entry the speech pattern of which matches the comparable speech pattern of the search term best is entered as a search term for an alphanumeric search through the connected databases, on the basis of the entered search term, the predecessor or a plurality of predecessors and the successor or a plurality of successors to the search term and, if available, the search term itself from each of the databases are stored in a search table, and the search term, if stored in the search table, or that term from the successors stored in the search table which comes closest after the entered search term is displayed.

The combination of a speech recognition based search with an alphanumeric or text based search improves the flexibility of searching entries in a plurality of databases available in a specific environment and linked by any kind of communication links, in particular any kind of digital communication links.

The invention makes it possible to search simultaneously, quickly and conveniently in two or more databases by combining the databases into one database system in which each of the databases has an associated database control device.

In this case, the database system also comprises at least two databases, each of which has an associated database control device including speech recognition back end means for comparing comparable speech patterns, a database primary control apparatus which can be connected to the database control devices for the purposes of transmitting data including comparable speech patterns and control commands to the database control devices and receiving them therefrom, which has a speech recognition middle part means as well as an associated search table memory which is able to store data transmitted from the database control devices, and a voice controlled user interface for inputting control commands and search terms so as to control the system and simultaneously search data in the connected database, the user interface is connected to the database primary control apparatus and comprises speech recognition front end means for processing a sound sequence of a search term input by speech to obtain a comparable speech pattern.

According to an advantageous refinement of the invention the speech recognition front end means comprises processing means for obtaining a phoneme sequence as comparable speech pattern.

Another development of the invention is characterized in that the speech recognition back end means comprises comparing means for comparing speech patterns, for determining a measure for the matching distance between the compared speech patterns as well as for determining that entry of the database the comparable speech pattern of which matches the comparable speech pattern of the search term best.

Alternatively the speech recognition middle part means comprises comparing means for comparing measures for the matching distances between the compared speech patterns and for selecting that database entry the speech pattern of which matches the comparable speech pattern of the search term best.

An advantageous provision is that the database primary control apparatus is connected to a database access interface to which the database control devices of the databases can be connected for the purpose of interchanging data, comparable speech pattern, e. g. phoneme sequences or the like, and control commands using communication links. In this case, the communication links provided may be radio links, such as radio-frequency interfaces operating at radio frequencies, e.g. with a short range on the basis of a Bluetooth standard, with a long range on the basis of the GPRS (General Packet Radio Service) or UMTS standard (Universal Mobile Telecommunication System), infrared links or else wired links.

The invention can, in principle, be used for all databases from whose entries comparable speech patterns can be calculated or whose entries include a comparable speech pattern. On the basis of the main area of application of the present invention, namely communication, provision is made for the databases to be telephone directory, address book and/or appointments diary databases.

In this case, it is particularly expedient if the databases are provided on various apparatuses, at least one of which is a telephone, in particular a mobile telephone, with the database primary control apparatus being provided in the telephone, e. g. in the mobile telephone or in the car phone. In this case, the user interface of the telephone, that is to say its various input and output facilities, such as voice command input unit and keypad and also screen and voice output unit, can be used as the user interface for the database system.

In another development of the invention, a plurality of database primary control apparatuses are provided, each of which is arranged in a different apparatus.

BRIEF DESCRIPTION OF THE DRAWINGS

The invention is explained in more detail below by way of example with reference to the drawings, in which.

DETAILED DESCRIPTION

Figure 1:
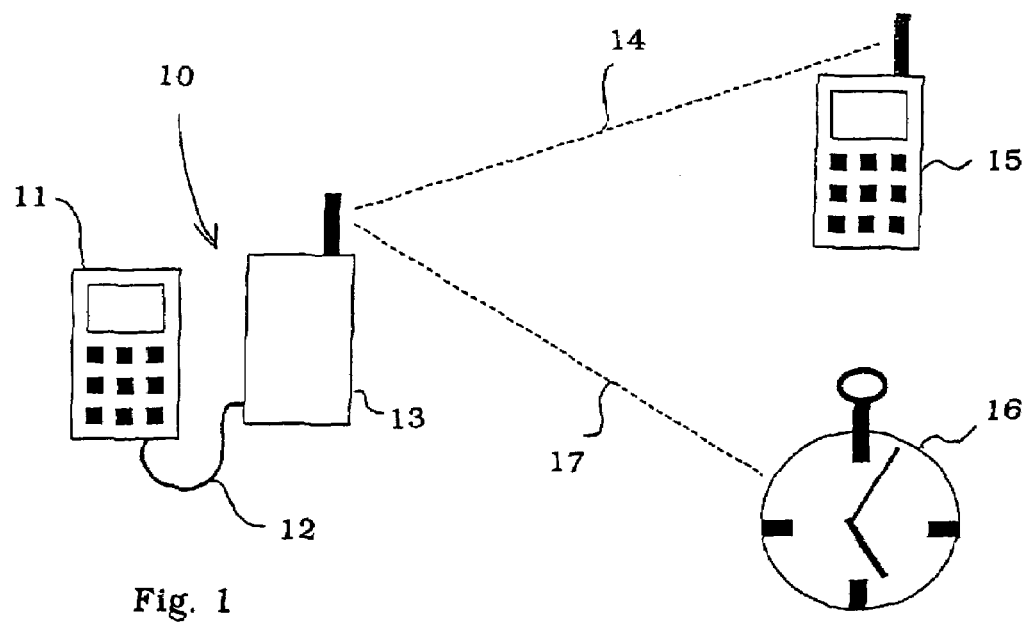
FIG. 1 is a schematic illustration of a plurality of electronic appliances which communicate with one another and contain databases.

In various figures of the drawing, mutually corresponding elements are provided with identical reference symbols.

FIG. 1 shows two mobile telephones, namely a car telephone 10 with a handset 11 connected to a telephone 13 by means of a line 12, and a 'mobile' or 'cellular phone', called mobile telephone 15 below. The mobile telephone 15 is connected to the car telephone 10 via radio interface 14, in particular via a digital radio interface, e. g. via a bluetooth interface. In addition, a watch 16 is provided as a further electronic appliance with a database, the watch 16 containing an electronic notebook which also comprises a telephone directory database. The electronic notebook in the watch 16 is connected to the car telephone 10 via a further radio interface 17.

Figure 2:
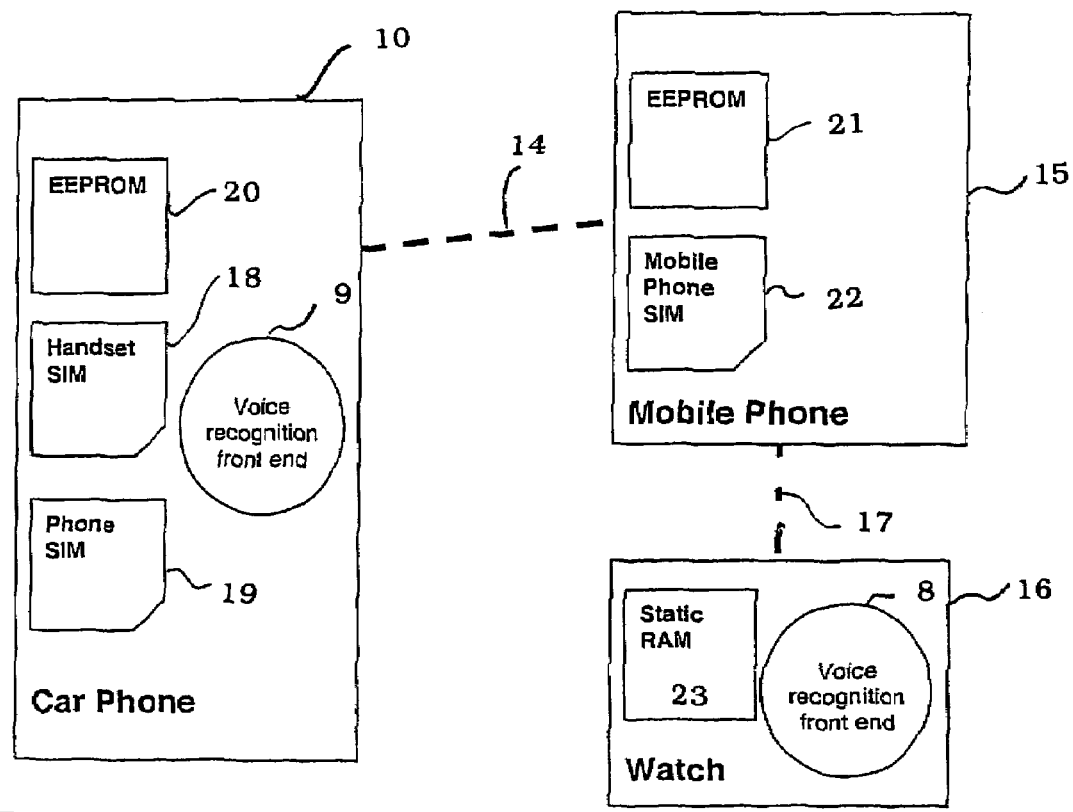
FIG. 2 shows a schematic block diagram of the arrangement of the individual database memories in the electronic appliances.

As FIG. 2 shows schematically, the car telephone 10 contains a voice recognition front end means 9 of a voice recognition system used with the present invention and three memories on which telephone directory databases, called telephone directory or directories for short below, are recorded. A SIM card 18 in the handset 11 and a SIM card 19 in the telephone 13 and also a memory of the telephone 13, for example in the form of an electronically erasable, programmable read-only memory (EEPROM), store three different telephone directories $D_1$, $D_2$, $D_3$ physically separately from one another. The mobile telephone 15 comprises two telephone directories $D_4$, $D_5$, one of which is stored in the memory 21 of the mobile telephone set itself and the other of which is stored on the SIM card 22. The watch 16 comprises a user interface with another voice recognition front end means 8 and a static memory 23 with random access (static RAM), in which a further personal telephone directory $D_6$ is stored.

The telephone directories $D_1$, $D_2$, $D_3$, $D_4$, $D_5$, $D_6$ stored on the SIM cards 18, 19, 22 and in the memories 20, 21, 23 have associated database control devices, called control devices 18', 19', 20', 21', 22', 23' or slaves for short below, each of which comprises a speech recognition back end means 6 of the speech recognition system used with the present invention (cf. FIG. 3). The control devices 18', 19', 20' for the telephone directories $D_1$, $D_2$, $D_3$ of the car telephone 10 are connected by means of wired links 24 to a database or telephone directory access interface 25 which sets up data transfer links between the control devices or slaves 18'-23' and a central database primary control apparatus 26, called master 26 for short below.

The master 26, which is accommodated in the car telephone 10 in the exemplary embodiment shown, comprises a speech recognition middle part 7 of the speech recognition system and is connected to a user interface 28 including the voice recognition front end 9. The user interface 28 in this case is formed by the user interface of the handset 11. Further, the master is connected to a search table memory 27 for storing database entries or identifiers and/or comparable speech patterns thereof determined by a search through several databases. Such a search table memory 27, the structure of which will be explained hereinafter in more detail, is suitable for supporting a scrolling function that allows the user to scroll through the database entries.

Alternatively, the master 26 may be provided together with the search table memory 27 in the mobile telephone 15.

In this case, the user interface of the mobile telephone 15 then serves as user interface 28. It is also possible for two central database primary control apparatuses or masters 26 to be provided, which can then be used to access the telephone directories $D_1$-$D_6$ virtually simultaneously. In the case of two masters, it is also possible that only one of the masters 26 provides access to the telephone directories $D_1$-$D_6$.

Furthermore, since the watch 16 is provided with a voice recognition front end 8 as shown in the drawings the user interface of the watch 16 can be used as user interface 28. It should be noted that the different functions of the described system can be distributed in different manners to the different devices and apparatuses.

The inventive method for searching data will now be explained by way of example. FIGS. 4a to 4c show the entries in telephone directories D1, D5 and D6 provided in the car telephone 10, the mobile telephone 15 and the watch 16, respectively. For the sake of clarity, the directories D1, D5, D6 are shown as simple lists of identifiers, i.e. names of persons, companies, restaurants or the like. Each identifier is associated with an entry of a directory that can include one or more telephone numbers the address or addresses of a specific person or company, as well as more than one identifier. In particular, it is possible to provide for example two fields for identifiers for each entry in a database so that a person can be identified by her/his given name and/or surname. In addition, such a structure of the entries can be used to provide easy access to telephone numbers, e-mail addresses, street addresses and the like of different employees of the same company.

The structure of telephone directories, address books, organizer or note book databases are well known in the art and it is possible to modify them in various manners. Depending on the structure of the identifying items, the search can optionally be performed either through all kinds of identifier fields or through a specific one. However, the following description of the present invention will be made with reference to only one identification field for each database entry. Further, it is supposed that each identifier is associated with a comparable speech pattern. Such a comparable speech pattern can be either stored in the respective database entry or can be generated from the identifier itself e. g. by text to speech conversion means or the like. Irrespective of the way the speech pattern $A_{n,i}$ associated with a database entry $E_{n,i}$ is obtained, the speech pattern $A_{n,i}$ is always mentioned as the speech pattern of an entry $E_{n,i}$.

Figures 3, 4A, 4B, 4C:
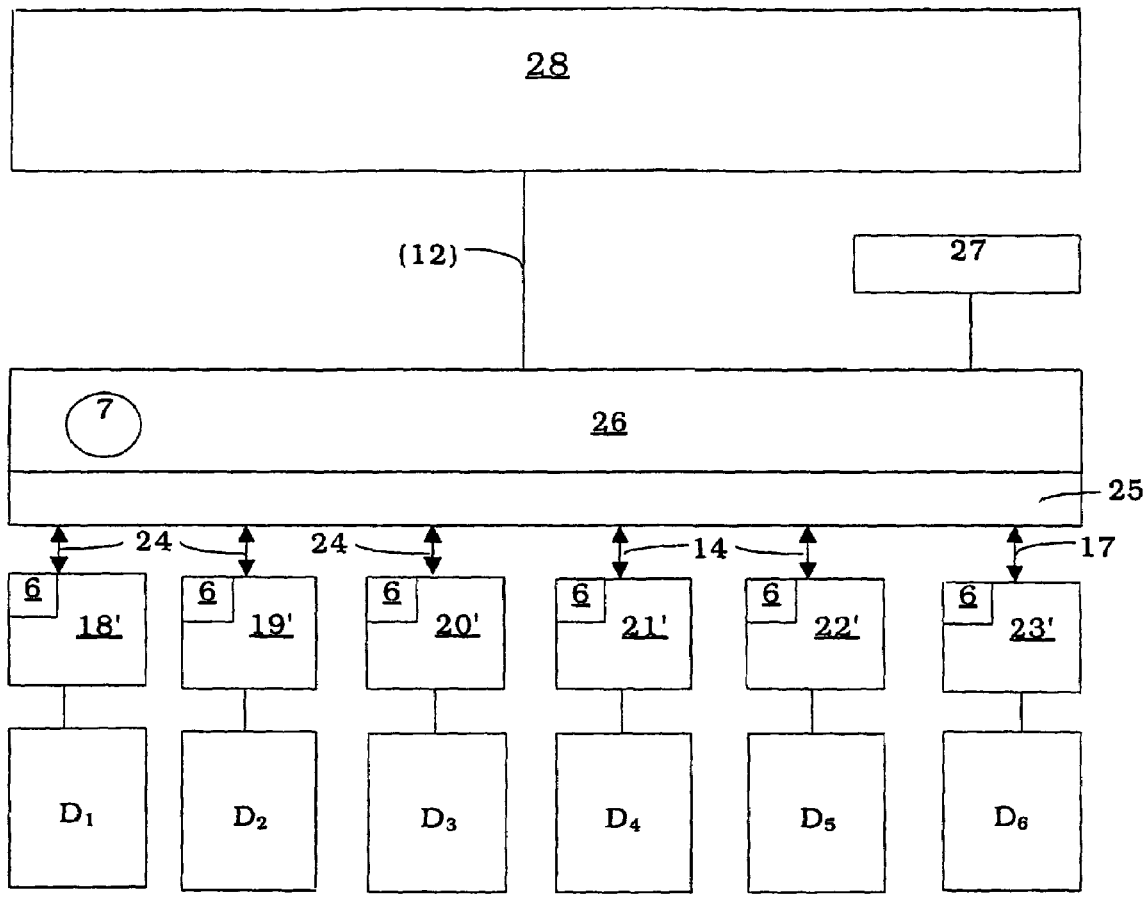
FIG. 3 shows a schematic block diagram of the inventive database system.
FIG. 4a to 4c show tables to illustrate database entries in various databases.

If, by way of example, the telephone directory entry for ALEX, i.e. the first entry in the example of FIG. 4b, is to be ascertained in the directories D1, D5, D6, the name ALEX is uttered by a user and therefore input as a search term by speech. The sound sequence received by the voice recognition front end of the user interface 28 is processed to obtain a comparable speech pattern X of the search term ALEX. The comparable speech pattern X can be of any suitable form, for example the speech pattern X can be the phoneme sequence. However, it is also possible to use a speech to text conversion means so that the comparable speech pattern would be the search term as an alphanumeric sequence of characters. Furthermore, it is also possible to store a spoken sound sequence together with the identifier in alphanumeric form for each entry and to compare the sound sequence that is processed to improve the comparability thereof with the stored sound sequence processed in the same way.

After generating a comparable speech pattern X of the search term, this comparable speech pattern is transmitted to the control devices 18', 22', 23' of the active databases D1, D5 and D6 (to simplify the description the databases D2-D4 are supposed as inactive).

In the control devices or slaves 18', 22', 23' the respective speech recognition back end means 6 compare the comparable speech pattern X with each comparable speech pattern A of each database entry E of each directory $D_n$ separately to determine a measure m(X,A) for all database entries. These measures indicate the matching distances between the compared speech patterns X,A. After obtaining a measure m(X,A) for each entry in a specific database D1, D5, D6 the respective slaves 18', 22', 23' set up internally a table which contains all the directory entries $E_{n,i}$ of the respective database $D_n$ in the order in which they match the comparable speech pattern of the search term. Thereafter, the first, or the first two or three best matching entries of each database $D_n$ are transmitted back to the master 26 together with the corresponding sound patterns A.

The best matching entry $m_n(X, A_{n,j})$ is determined as the smallest measure of all entries $E_{n,i}$ of the directory $D_n$ in accordance with the following equation $m_n(X,A_{n,j}) < m(X, A_{n,i})$ for all i≠j, wherein i=1, 2, ... $k_n$ and $k_n$ the number of entries of nth database ($D_n$).

In case that the measure m(X,A) of the matching distance between compared speech patterns, is obtained in the same way for each directory $D_n$, it is possible that the best matching speech pattern of all databases or directories $D_n$ can be obtained by simply comparing the measures sent from the slaves 18', 22', 23' to the master in accordance with the following equation $m_h(X,A_{p,j}) < m(X,A_{n,j})$ for all n≠p, wherein n=1, 2, ... q and q is the number of databases ($D_n$) to be searched.

However, usually each slave 18' to 23', i.e. the speech recognition back end means 6 thereof uses its own system for obtaining the measure. In this case, the speech recognition middle part means 7 of the master 26 calculates its own measures m(X,A) for each sound pattern associated with the entries sent from the slaves 18' to 23' in response to the search request.

Thereafter, the speech recognition middle part means 7 of the master 26 sets up a table which contains the database entries sent to the master in response to the search request in the order in which they phonetically match the search term. This table is stored in the search table memory 27. In the above example where the search term is ALEX, the slave 18' of the directory D1 sends the entries ADAC and HALALI to the master 26. Slaves 22' and 23' of the directories D5 and D6 of the mobile and the watch, respectively send the entries ALEX, ANDY and ALICE back to the master 26. Upon setting up the table of these entries in the order of increasing matching distances, these entries are stored in the following order in the search table memory 27: ALEX, ALICE, ANDY, HALALI, ADAC. Thus, ALEX has been determined as best matching entry that will be output by the user interface 28 by showing this entry on the display. Instead of or in addition to displaying the name ALEX of the entry with the best matching sound pattern, it is possible to output the name ALEX by speech. Further, it is possible to display not only the best matching entry but also some of the other entries contained in the table stored in the search table memory 27 in dependence on the capability of the display used.

After inputting the search term ALEX, it is also possible that ALICE is determined as having the best matching sound pattern with the sound pattern X of the search term ALEX due to background noise or variations in pronouncing the name ALEX. In this case, when three or five of the best matching entries are output on the display, it is possible for a user to scroll to the list of the best matching entries stored in the search table memory 27 in a usual manner.

Therefore, it is possible to find the desired entry in all directories or databases $D_n$ which are connected to the system.

Therefore, a seamless integration of multiple databases to a speech recognition based search is possible so that downloading or synchronizing of all database entries into one central device can be avoided. The inventive method makes it possible to control a search through any kinds of electronic databases like telephone directories or address books or the like on SIM cards, in random access memories, in EEPROMS, on harddrives of computers etc. An essential advantage of using the inventive method is that the master 26 and the user interface only needs relative low RAM capacities.

Although the inventive method of searching data entries based on speech input in a reliable manner, it is further possible to combine this speech recognition based search with an alphanumeric search using the different databases or directories $D_n$ in the alphabetic order. In this case, after determining this entry of all active directories $D_n$, the sound pattern of which matches that of the search term best and upon setting up the above-mentioned table by the master 26, i.e. the speech recognition middle part means 7 the user can select one of the displayed entries, i.e. the identifier thereof for a text based search through all directories. This search will be described in connection with FIGS. 5a to 5c that shows the identifiers of the databases D1 to D3 as names of German, Finnish and American cities. For the sake of clarity, the telephone numbers and other terms stored in the databases or telephone directory entries are not shown and the databases D4-D6 are supposed as inactive.

Figures 5A, 5B, 5C:
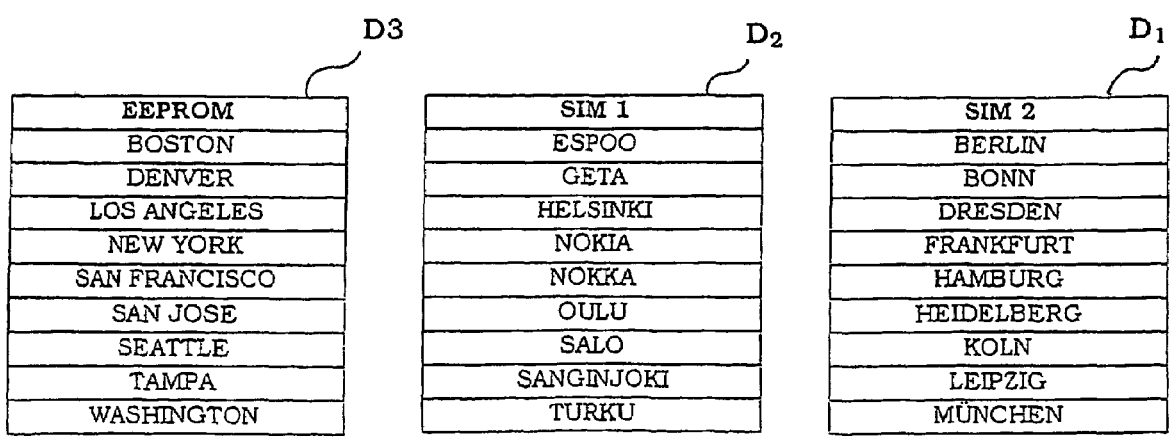
FIG. 5a to 5c show tables to illustrate database entries in various databases.

If, by way of example, the identifier SAN FRANCISCO found by a speech recognition based search in the directory D3 shown in FIG. 5a has been selected as search term for an alphanumeric search the primary control apparatus 26 transmits the character sequence of the search term as a search query via the access interface 25 to the control devices 18' to 20'. For the search term SAN FRANCISCO the control device 18' ascertains MUNICH as the previous entry and BERLIN as the next entry in the directory D1. Accordingly, the control device 19' finds SALO as the previous entry and SANGINJOKI as the next entry in the telephone directory D2, while the control device 20' finds NEW YORK as the previous entry. SAN FRANCISCO as the current and SAN JOSE as the next entry. The control devices 18' to 20' then supply the primary control apparatus 26 with the names or identifier which have been found. Depending on the capacity of the search table memory 27 each identifier can be transmitted with the complete terms of the entries or only with a unique identification number that ensures access to the selected entry of the directories $D_n$. The names or identifier of the entries found are stored together with the identification information (not shown) in a search table in the search table memory 27, as shown in the table below.

TABLE I

| Search direction | EEPROM | SIM 1 | SIM 2 |
|---|---|---|---|
| Previous | NEW YORK | SALO | MUNICH |
| Current | SAN FRANCISCO | — | — |
| Next | SAN JOSE | SANGINJOKI | BERLIN |

If the user now wants to cycle or scroll through the telephone directories starting with the telephone directory entry SAN FRANCISCO which is displayed to him, he is able to use appropriate search keys, rotary knobs or the like of the user interface 28 to enter the search direction previous or next. If he selects next, then the primary control apparatus 26 finds the term SANGINJOKI in the search table as the closest successor to the search term SAN FRANCISCO and displays the term SANGINJOKI. At the same time, the term SANGINJOKI is transmitted to the control devices D1-D3 in order to establish the associated previous and next terms. In addition, the primary control apparatus 26 asks the control device D1 to transmit the full telephone directory entry for SANGINJOKI. Following updating, the search table below is produced.

TABLE II

| Search direction | EEPROM | SIM 1 | SIM 2 |
|---|---|---|---|
| Previous | SAN FRANCISCO | SALO | MUNICH |
| Current | — | SANGINJOKI | — |
| Next | SAN JOSE | TURKU | BERLIN |

If the search direction next is then selected, the new search term produced is SAN JOSE, while, for the search direction previous, the term SAN FRANCISCO would again be found. If, however, the previous term is selected on the basis of search table I, the new search term becomes SALO, and the search table below is produced.

TABLE III

| Search direction | EEPROM | SIM 1 | SIM 2 |
|---|---|---|---|
| Previous | NEW YORK | OULO | MUNICH |
| Current | — | SALO | — |
| Next | SAN FRANCISCO | SANGINJOKI | BERLIN |

If the user continues to cycle or scroll in the direction previous, the new search term produced is OULO, for which the predecessor and successor are then sought in the telephone directory D2 from which the new search term originates, and the primary control apparatus 26 retrieves the telephone directory entry from the telephone directory D2 using the control device 19'.

TABLE IV

| Search direction | EEPROM | SIM 1 | SIM 2 |
|---|---|---|---|
| Previous | NEW YORK | NOKKA | MUNICH |
| Current | — | OULO | — |
| Next | SAN FRANCISCO | SALO | BERLIN |

It is thus evident that the inventive method can be used to scroll through a plurality of telephone directories as through a single telephone directory organized alphabetically. The user is thus accessing a virtual telephone directory which contains the entries from all connected telephone directories in strictly alphabetical order. If the primary control apparatus has a sufficiently large search table memory 27 available, it is also possible to ascertain not one predecessor and one successor to the search term for each telephone directory, but rather two or more predecessors and two or more successors, and to store them in the search table memory 27, which allows the response speed of the inventive method to be increased further.

With an appropriately high storage capacity and high data transfer rates between primary control apparatus 26 and the control devices $D_n$, it is also possible for not only the names of the telephone directory entries but the full telephone directory entries for the predecessor and successor to be transferred and stored in the search table memory. In this case, it would also be possible for not just the name of the telephone directory entry but also, at the same time, the associated telephone number to be displayed to the user.

The inventive database system may also be extended in a simple manner by connecting additional telephone directory databases, so long as the capacity of the search table memory 27 is sufficient. If, by way of example, the mobile telephone 15 is brought into the area of the car telephone 10, so that the radio interface 14 can be used to interchange data between the mobile telephone 15 and the car telephone 10, the control devices 18', 19' for the telephone directories D1, D2 register with the primary control apparatus 26, which then also includes the newly registered telephone directories D1, D2 when subsequently searching in the telephone directories. If the link between the car telephone 10 and the mobile telephone 15 is interrupted, then the primary control apparatus 26 establishes that the telephone directories D1, D2 are no longer available, and searches only in the connected telephone directories, as described above.

If a database, e.g. the telephone directory D6, is registered in a database system by its control device 23' while a search is being carried out in the databases or telephone directories, that is to say while a user is scrolling through the databases or telephone directories, the primary control apparatus 26 transmits, in response to registration of the database or of the telephone directory D6, the current search term together with a search query to the control device 23', which then performs a corresponding search in the telephone directory D6 and transmits the terms found in the course of this back to the primary control apparatus 26 for the purpose of writing them into the search table, where these terms are handled in the same manner as the others. The inventive method thus permits a smooth search in the databases of a database system even when databases are being added or removed.

The invention claimed is:

1. A method for searching data in at least two databases comprising:
   inputting a search term by speech,
   processing a sound sequence of the search term to obtain a comparable speech pattern thereof,
   comparing the comparable speech pattern of the search term with corresponding speech patterns of database entries to determine for each entry of the at least two databases a measure for the matching distance between the compared speech patterns to determine at least that database entry of each database the speech pattern of which matches the comparable speech pattern of the search term best,
   selecting that database entry the speech pattern of which matches the comparable speech pattern of the search term best from the entries determined previously by searching that measure that indicates the best matching speech pattern of the database entries, and
   outputting an identifier of that database entry that has been selected previously,
   wherein the identifier of that database entry is entered as a search term for an alphanumeric search through the at least two databases, wherein
   on the basis of the entered search term, the predecessor or a plurality of predecessors and the successor or a plurality of successors to the search term and, if available, the search term itself from each of the databases are stored in a search table memory, and
   the search term, if stored in the search table memory, or that term from the successors stored in the search table memory which comes closest after the entered search term, is displayed.

2. A method according to claim 1, wherein for each database a respective table is set up that contains all database entries in the order in which their speech pattern phonetically match the speech pattern of the search term.

3. A method according to claim 1, wherein processing the sound sequence of the search term results in a phoneme sequence used as comparable speech pattern.

4. A method according to claim 1, wherein the measure that indicates the closest matching distance between the compared speech patterns is determined in accordance with the following equation:

$$m_n(X,A_{n,j}) < m(X,A_{n,i}) \text{ for all } i \neq J$$

wherein i =1, 2, ... $k_n$ and $k_n$ is the number of entries of $n^{th}$ database and m is the measure.

5. A method according to claim 1, wherein the measures indicating the best matching database entries of each database are compared to select that database entry the speech pattern of which matches the comparable speech pattern of the search term best.

6. A method according to claim 1, wherein
   the comparable speech pattern of the search term is compared with the comparable speech patterns of those database entries that have been determined as that of the respective databases that match the search term best to determine for each of these entries a measure for the matching distance between the compared speech patterns, and
   at least that database entry that matches the search term best of all is determined by searching that measure that indicates the best matching speech pattern of all the database entries of all databases.

7. A method according to claim 6, wherein the measure that indicates the closest matching distance between the compared speech patterns is determined in accordance with the following equation:

$$m_h(X,A_{p,j}) < m(X,A_{n,j}) \text{ for all } n \neq p$$

wherein n =1, 2, ... q and q is the number of databases to be searched.

8. A device for searching data in at least two databases comprising:
   means for inputting a search term by speech,
   means for processing a sound sequence of the search term to obtain a comparable speech pattern thereof,
   means for comparing the comparable speech pattern of the search term with corresponding speech patterns of database entries to determine for each entry of the at least two databases a measure for the matching distance between the compared speech patterns to determine at least that database entry of each database the speech pattern of which matches the comparable speech pattern of the search term best,
   means for selecting that database entry the speech pattern of which matches the comparable speech pattern of the search term best from the entries determined previously by searching that measure that indicates the best matching speech pattern of the database entries, and
   means for outputting an identifier of that database entry that has been selected previously,
   wherein the identifier of that database entry is entered as a search term for an alphanumeric search through the at least two databases, means for storing, on the basis of the entered search term, the predecessor or a plurality of predecessors and the successor or a plurality of successors to the search term and, if available, the search term itself from each of the databases, in a search table memory, and means for displaying the search term, if stored in the search table memory, or that term from the successors stored in the search table memory which comes closest after the entered search term.

9. A device for searching data in at least two databases comprising:

a handset for inputting a search term by speech, a speech recognition front end module for processing a sound sequence of the search term to obtain a comparable speech pattern thereof, a speech recognition back end module for comparing the comparable speech pattern of the search term with corresponding speech patterns of database entries to determine for each entry of the at least two databases a measure for the matching distance between the compared speech patterns to determine at least that database entry of each database the speech pattern of which matches the comparable speech pattern of the search term best, a speech recognition middle part module for selecting that database entry the speech pattern of which matches the comparable speech pattern of the search term best from the entries determined previously by searching that measure that indicates the best matching speech pattern of the database entries, and a user interface for outputting an identifier of that database entry that has been selected previously, wherein the identifier of that database entry is entered as a search term for an alphanumeric search through the at least two databases, a memory for storing, on the basis of the entered search term, the predecessor or a plurality of predecessors and the successor or a plurality of successors to the search term and, if available, the search term itself from each of the databases, in a search table memory, and a display for displaying the search term, if stored in the search table memory, or that term from the successors stored in the search table memory which comes closest after the entered search term.

* * * * *